Nov. 1, 1966

G. L. BROWN ETAL 3,282,372

DIRECT DRIVE METHOD AND APPARATUS FOR GENERATING
SEISMIC VIBRATORY SIGNALS

Filed Nov. 14, 1962

INVENTORS
GRAYDON L. BROWN,
DELBERT W. FAIR,
BY LORENZO E. JARRETT, JR &
LANGDON H. BERRYMAN

William J. Miller
ATTORNEY

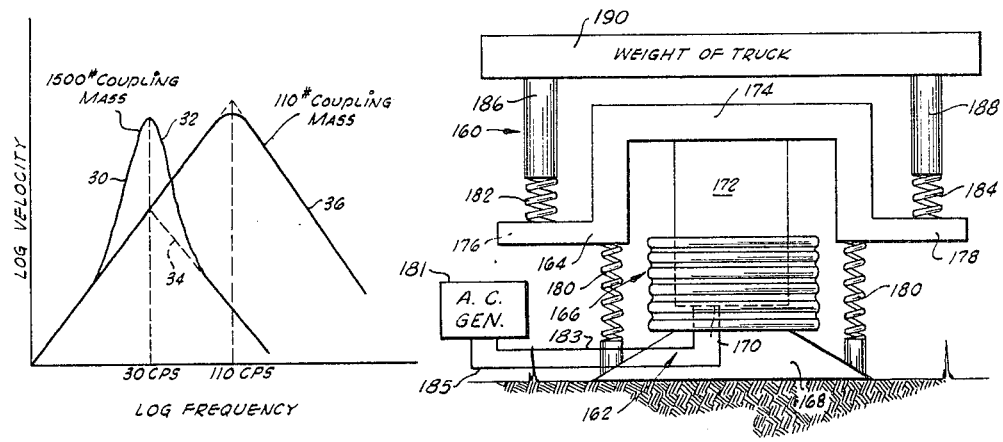
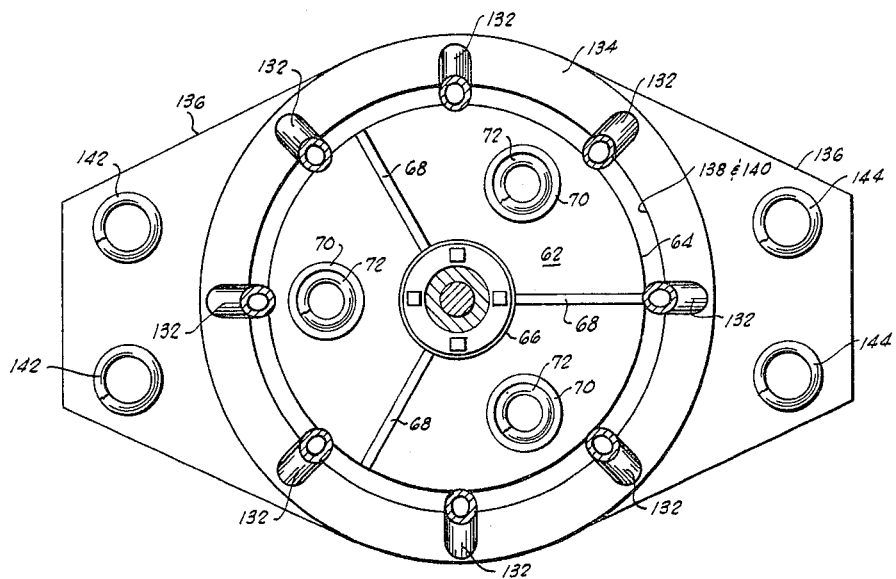

3,282,372
DIRECT DRIVE METHOD AND APPARATUS FOR GENERATING SEISMIC VIBRATORY SIGNALS
Graydon L. Brown, Delbert W. Fair, and Lorenzo E. Jarrett, Jr., Ponca City, Okla., and Langdon H. Berryman, Hacienda Heights, Calif., assignors to Continental Oil Company, Ponca City, Okla., a corporation of Oklahoma
Filed Nov. 14, 1962, Ser. No. 237,662
7 Claims. (Cl. 181—.5)

The present invention relates generally to improvement in the art of seismic surveying of subterranean geological formations, and more particularly, but not by way of limitation, relates to a method and apparatus for generating multifrequency seismic signals.

In U.S. Patent No. 2,688,124, entitled "Method of and Apparatus for Determining Travel Time of Signals," issued to W. E. N. Doty et al. on August 31, 1954, a revolutionary method of seismic surveying was disclosed wherein a seismic signal of controlled frequency is induced in the earth and travel time of the signal to and from a reflective interface is determined by phase shifts in the signal. One of the most serious practical problems to the successful practice of this seismographic method has been the development of suitable transducers for inducing seismic signals of controlled frequency content and sufficient magnitude in the earth. In most cases, the seismic signal varies in frequency, lineally, over the range from approximately 15 cycles per second to as high as 100 cycles per second. Since the cyclic signals must travel to deep subterranean interfaces and then be reflected back to the surface, the signals must originally have a very high energy level. This is particularly true in the higher portion of the frequency spectrum from, for example, 50–100 c.p.s. because, as pointed out in greater detail in U.S. Patent No. 2,808,577, issued to J. M. Crawford et al. on October 1, 1957, the earth substantially attenuates the higher bands of the frequency spectrum.

As taught in U.S. Patent No. 2,808,577, it is highly desirable that the reflected and recorded signal have the same amplitude over the entire frequency spectrum. This is considerably complicated by the fact that the earth attenuates the higher frequency portion of the signal to a pronounced extent. It is known that if the higher frequency portion of the transmitted signal is increased in magnitude, the received signal will have a more uniform amplitude over the entire frequency spectrum. Considerable research effort has been expended toward the development of a suitable transducer capable of imparting a high energy level signal to the earth at the higher portion of the frequency spectrum. For example, mechanical vibrators have been designed and tested which utilize counter-rotating eccentric weights. In such a vibrator, the housing for the eccentric weights, as well as the motor for rotating the weights, together with all support equipment are mounted on what may be termed a coupling plate which is pressed against the surface of the earth. A static hold-down weight is then applied to the coupling plate to maintain contact with the earth and rotation of the eccentric weights then vibrates the coupling plate. Electromagnetically driven transducers have been designed in which a heavy field magnet and core are connected to a relatively heavy coupling plate which is pressed against the surface of the earth by a static load. An actuating coil disposed adjacent to the field magnet and core is then connected to a relatively small reaction mass. Upon energization of the coil by an alternating current signal, the reaction mass is reciprocated relative to the field magnet and core, resulting in a reactive vibratory force being applied to the coupling plate which thereby induces a vibratory signal in the earth.

Similarly, hydraulically actuated transducers have been designed in which a reaction mass is reciprocated relative to a coupling plate by a hydraulic linear actuator. In all such structures heretofore utilized, the coupling plate has been constructed in such a manner as to have a total mass as great as, and in most cases somewhat greater than, the weight of the reaction mass. In each case the transducers may be generally categorized as reaction type drivers in that the coupling plate is of a substantial mass by reason of the particular construction, and also because the coupling plate is pressed against the earth by a static load, which in nearly all cases will be the weight of a transporting truck as applied through some resilient members such as springs in the manner described in U.S. Patent No. 3,024,861, issued to F. Clynch on March 13, 1962, and entitled "System for Anchoring and Transporting a Seismic Vibrator." The reaction mass is then connected solely to the coupling plate by whatever type of actuating means, such as the hydraulic linear actuator, is used to reciprocate the reaction mass relative to the coupling plate.

In the above described reaction type transducers, the coupling plates and other components rigidly connected thereto usually have a total weight between 1,000 lbs. and 1,500 lbs. During operation of these transducers, the signal amplitude imparted to the earth, as measured by particle velocity at the surface of the earth, increases rapidly from 0 to approximately 30 c.p.s., and then falls off sharply in the frequency range from 30–100 c.p.s. Thus it will be noted that over the portion of the frequency spectrum where the energy imparted to the earth should be continually increased, as taught by U.S. Patent No. 3,024,861, the signals induced in the earth by reaction type transducers decrease rather than increase. We have discovered that the sharp increase and then sharp decline in the amplitude of the signal transmitted to the earth as measured by particle velocity at the surface occurs at the resonant frequency of the net system including the coupling mass, which is in contact with the earth, and the earth itself. In this net system, the earth acts as both a spring and a viscous damper such that the total net system involves a mass, a spring, and a viscous damper having a natural resonant frequency. In cases where the coupling mass is on the order of from 1,000–1,500 pounds, the natural resonant frequency usually occurs around 30 c.p.s., this being a very typical value but one which is dependent to some extent upon the earth characteristics of each locality and to some extent upon the area of the coupling mass which is in contact with the earth. We have also discovered that by using a coupling mass having a weight less than approximately 175 pounds, the particle velocity imparted to the earth will increase quite uniformly from 0 c.p.s. up to approximately 90 c.p.s. when plotted on a log scale. Therefore, broadly stated, the present invention involves the use of a relatively light weight coupling member pressed against the surface of the earth and having a surface area of contact sufficiently great as not to appreciably penetrate the surface of the soil for inducing a seismic signal in the earth having a frequency within spectrum from 0 c.p.s. to approximately 100 c.p.s. of generally constantly increasing particle velocity as the frequency increases. The present invention also contemplates the provision of a novel transducer for practicing the method of the present invention. Briefly, the transducer comprises a coupling member for engaging the surface of the earth having a contact area sufficiently large as not to appreciably penetrate the surface of the earth, a reaction mass system, and motor means interconnecting the coupling member and the reaction mass system for reciprocating the coupling member relative to the reaction mass system. The reaction mass system, taken as a whole, should have a mass sufficiently large as to maintain the coupling member in contact with the earth, and the coupling member should have a mass sufficiently low as to have a natural resonant frequency above 80 c.p.s. when coupled to the earth.

Therefore, it is a primary object of the present invention to provide an improved method for imparting seismic signals having a controllable frequency content in the frequency spectrum between 0–100 c.p.s. by which the particle velocity generated and thereby the amplitude of the signal imparted to the earth is progressively increased as the frequency is increased.

Another very important object of the present invention is to provide a device by which the method of the present invention may be practiced.

Still another object of the present invention is to provide a transducer of the type described which employs a hydraulic linear actuator for reciprocating the coupling member relative to the reaction mass system.

Yet another object of the present invention is to provide a transducer of the type described which utilizes electromagnetic motor means for oscillating the coupling member relative to the reaction mass system.

Still another very important object of the present invention is to provide a transducer of the type described wherein the transducer may be statically loaded by at least a portion of the truck used to transport the transducer without increasing the total weight of the coupling member.

Still another object of the present invention is to provide a transducer of the type described which will be operative when used on uneven or unlevel ground.

Many additional objects and advantages of the present invention will be evident to those skilled in the art from the following detailed description and drawings, wherein:

FIG. 2 is a graph in which the log of the soil particle velocity is plotted against the log of the frequency of the coupling mass, and serves as a comparison between the results obtained by the so-called reaction mass drive transducers with a direct drive transducer constructed in accordance with the present invention;

FIG. 4 is a sectional view taken substantially on lines 4—4 of FIG. 3; and

FIG. 5 is a somewhat schematic view in elevation of another seismic transducer constructed in accordance with the present invention.

Figure 1:
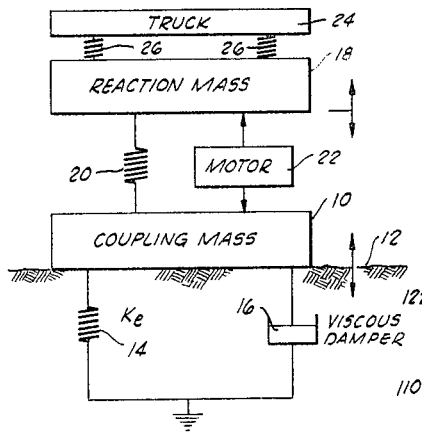
FIG. 1 is a schematic diagram which serves to illustrate the method and apparatus of the present invention.

Referring now to the drawings, and in particular to FIG. 1, a coupling mass 10 is shown resting on the surface of the earth 12. The coupling mass 10 has a sufficiently large area in contact with the surface 12 of the earth so that upon reciprocation of the coupling mass 10, as hereafter described in greater detail, the coupling mass will not appreciably penetrate the surface 12 of the earth. It has been discovered that the earth reacts as a viscous damper spring within the seismic frequency spectrum from 20–100 c.p.s. Therefore in FIG. 1 the earth system is represented by a spring 14 having a spring constant $K_e$, and by a viscous dampening function, represented by the schematic dashpot 16. A reaction mass system is represented by the reference numeral 18 and may be connected to the coupling mass 10 by a static load spring 20. A motor 22, of any suitable type, provides a means for reciprocating the coupling mass 10 relative to the reaction mass 18. The reaction mass 18 may be statically loaded by at least a portion of the weight of a truck 24 through one or more static loading springs 26.

Referring now to FIG. 2, the curve 30 is a plot of the log of the particle velocity induced at the surface of the earth against the log of the frequency at which a coupling mass weighing approximately 1500 lbs. is reciprocated. The particle velocity of the earth is chosen as the measure of the magnitude of the signal energy imparted to the earth because the geophones most commonly used are sensitive to particle velocity. It will be noted that the curve 30 peaks sharply to maximum particle velocity at about 30 c.p.s. This peak in velocity is due to the fact that during the portion of the curve 30 from 0–30 c.p.s., the force generated by the motor 22 which reciprocates the coupling mass 10 is acting only against the force of the earth spring 14. As the combined system of the coupling mass 10 and the earth spring 14 reaches the natural resonant frequency, which is 30 c.p.s. in the illustrated example, the earth spring 14 is phased so as to assist the motor in reciprocating the coupling mass 10, the particle velocity quickly goes to the maximum value for the particular force available from the motor 22, and of course from the reaction mass 18. As the frequency increases beyond the resonant frequency of 30 c.p.s., the particle velocity drops off sharply along portion 32 of the curve 30 as the resonant assistance from the earth spring 14 is reduced. The curve continues to drop sharply until it reaches the constant slope of dotted line 34 which represents the limitations imposed upon particle velocity as a result of the weight of the coupling mass 10 which resists reciprocation by the constant force of the reciprocating motor 22.

The resonant frequency of the system including the coupling mass 10 and the earth spring 14 can be expressed by the equation:

$$\omega = \frac{\sqrt{K_e}}{M} \tag{1}$$

where $\omega$ is the angular frequency in radius per second, $K_e$ is the spring constant of the earth spring 14 in pounds per foot, and M is the mass of the coupling mass 10 in pounds second$^2$/ft. Thus it will be seen that for a given earth spring constant $K_e$, the mass M of the coupling mass 10 must be drastically reduced in order to attain a substantial increase in particle velocity at the higher frequencies. By substituting, in Equation 1, a resonant frequency of 30 c.p.s., and a weight of 1500 lbs. as follows:

$$2\pi(30) = \sqrt{\frac{K_e}{\frac{1500}{32.2}}}$$

the value of $K_e$ can be obtained and is equal to $1.65 \times 10^6$ lb./ft. Using this value of $K_e$, which is very typical and approximately the same for most localities and for a given contact area of the coupling mass, it will be noted that in order to provide a peak particle velocity at the maximum frequency of the seismic signal which it is desired to induce in the earth, the optimum weight of the coupling mass can be obtained. For example, assume that it is desired to induce a seismic signal in the earth having a frequency content within the audio range from 20–110 c.p.s. The optimum weight for the coupling mass 10 may then be determined from the following equation which is derived from Equation 1:

$$M = \frac{K_e}{\omega^2} \tag{2}$$

Substituting the earth spring constant value of $K_e$ $1.65 \times 10^6$ lb./ft., and a resonant frequency value of $\omega = 110$ it is determined that the coupling mass M should be equal to 110 lbs. Use of a coupling mass of 110 lbs. could then be expected to produce a velocity-frequency curve 36 as shown in FIG. 2. It should be noted that at the higher frequencies of the spectrum, the signal magnitude is increased progressively as is desired, rather than falling sharply between 30 c.p.s. and 110 c.p.s. In seismographic surveying, the most common frequency range of the controlled seismic signal is 15–90 c.p.s. Accordingly, the maximum weight of the coupling mass should be, based on the value of $K_e$ found above, approximately vention is indicated generally by the reference numeral 160. The transducer 160 has substantially the same mode of operation as the transducer 50 and comprises a coupling mass member, indicated generally by the reference numeral 162, and a reaction mass member, indicated generally by the reference numeral 164, which are interconnected by an electromagnetic motor, indicated generally by the reference numeral 166. The coupling mass member 162 is comprised of a footplate 168 which may be cast from aluminum in substantially the same form as the footplate 62 of the transducer 50. An electric actuating coil 170 may be connected to the footplate 168 in any conventional manner and is disposed around a core 172. The core 172 is connected to a reaction mass frame 174 which may have an effective form simulating an inverted U with outwardly extending flange portions 176 and 178 substantially as shown. An alternating current power means or generator 181 is connected through a pair of wires 183 and 185 to coil 170. A plurality of static loading springs 180 interconnect the flange portions 176 and 178 and the footplate 168. As in the case of the static loading springs 72 of the transducer 50, the springs 180 are selected so as to have a spring constant which will prevent resonance at a frequency within the operative frequency range of the transducer. Hold-down springs 182 and 184 connect the flange portions 176 and 178 to a pair of upright posts 186 and 188 of the lift mechanism of a transporting truck, represented by the box designated by the reference numeral 190, as described in connection with the transducer 50.

Except for the operation of the hydraulic linear actuator 56 of the transducer 50 as compared with the electromagnetic motor 166 of the transducer 160, the transducers 50 and 160 are operated in an identical manner. Accordingly, for convenience of discussion, only the operation of the transducer 50 will be described in detail. It will be evident to those skilled in the art that the transducer 50 is merely transported by truck to a locality at which it is desired to generate seismic waves. The transducer 50 is then lowered by the upright posts 150 and 152 until the footplate 62 engages the earth. The hydraulic mechanism which raises and lowers the upright posts 150 and 152 is then actuated to continue to move the posts downwardly with respect to the truck such that a substantial portion of the weight of the truck will be applied to the upright posts. This force will then be transmitted through the springs 142 and 144 to the plate 136, and from the plate 136 through the static loading springs 72 to the footplate 62. Then, upon actuation of the hydraulic valve 130, the linear actuator will reciprocate the footplate 62 in a vertical direction relative to the reaction mass system 54. Since the coupling mass member 52 weighs 175 lbs. or less, it will be evident that very little motion of the reaction mass system relative to the earth will be established. On the other hand, the coupling mass member 52 will be reciprocated by a substantially constant force and thereby will accelerate the earth particles in contact with the footplate 62 to a velocity corresponding approximately to that represented by the curve 36 in FIG. 2. It will also be appreciated by those skilled in the art that the electromagnetic transducer 160 will produce substantially the same curve 36, assuming that the weights of the coupling mass member and the reaction mass member correspond to the weights of the corresponding components of the transducer 50, and assuming that the force exerted by the electromagnetic motor is approximately equal to the force of the hydraulic linear actuator.

From the above detailed description of several preferred embodiments of the present invention, it will be evident to those skilled in the art that a highly novel method has been described whereby the particle velocity generated by a transducer can be controlled within desired frequency ranges to produce uniformly increasing velocities with increasing frequency. This, of course, is a measure of increasing signal magnitude as the frequency is increased, which is highly desirable in seismographic surveying work. Further, the method reveals a manner in which a drop in particle velocity in the upper frequency range can be avoided.

A novel transducer has also been described wherein the coupling mass members may readily be constructed in accordance with the method of the present invention in that the weights may be reduced to almost any desired value, and yet a sufficiently large surface contact area can be maintained with the earth so as to prevent appreciable penetration of the earth by the coupling member, thereby maintaining maximum efficiency and preventing destruction of roadways which are frequently used for convenience. However, the transducers will readily accommodate irregular surfaces of the earth by reason of the ball and joint coupling 82. The novel arrangement of the static loading springs 72 and hold-down springs 142 and 144 provides a means whereby the weight of the transporting truck may be utilized to hold the footplate 62 in continuous contact with the surface of the earth without danger of damaging the linear actuator or electromagnetic motor, as the case may be.

Having thus described several preferred embodiments of the present invention, it is to be understood that various changes, substitutions and alterations can be made therein without departing from the spirit and scope of the invention as defined by the appended claims.

What is claimed is:
1. A device for inducing seismic signals in the earth comprising:
   a coupling member for engaging a surface of the earth having a contact area sufficiently large as not to appreciably penetrate the surface of the earth;
   a reaction mass system; and,
   motor means interconnecting the coupling member and the reaction mass system for reciprocating the coupling member relative to the reaction mass system;
   the coupling member having a mass sufficiently low as to have a natural resonant frequency above 80 c.p.s. when coupled to the earth.
2. A device for inducing seismic signals in the earth as defined in claim 1 wherein the reciprocating motor comprises:
   a magnet assembly connected to and forming a part of the reaction mass system;
   a driving coil connected to and forming a part of the mass of the coupling member;
   and further characterized by alternating current electrical power means connected to the driving coil for supplying an alternating current to the driving coil and reciprocating the coupling member relative to the reaction mass system.
3. A device for inducing seismic signals in the earth as defined in claim 1 wherein the reciprocating motor comprises:
   a hydraulic motor having a cylinder and a piston assembly reciprocally disposed therein;
   the cylinder being connected to the reaction mass system and forming a part thereof; and,
   the piston assembly being connected to the coupling member and forming a part of the mass thereof.
4. A device for inducing seismic signals in the earth as defined in claim 1 wherein the reaction mass system is comprised of:
   a reaction mass reciprocally connected to the coupling member by the reciprocating motor; and,
   hold-down means for applying a static load to the reaction mass for maintaining the coupling member in contact with the earth.
5. A device for inducing seismic signals in the earth as defined in claim 1 comprising a hold down member connected to the reaction mass for holding the coupling member in contact with the surface of the earth:
   means connecting the hold-down member to the re-

175 lbs. in order to obtain the relatively uniform increase in velocity as the frequency increases to the natural frequency and to peak at the maximum frequency of the seismic signal which is to be used. If the velocity curve peaks at a frequency higher than the maximum frequency which is to be used, in the seismic signal, i.e., if the resonant frequency is 110 c.p.s. and the maximum signal frequency is 90 c.p.s., it will be evident that the maximum particle velocity available from the transducer will be wasted. Thus, the weight of the coupling mass 10 is preferably matched as closely as possible with the earth spring constant so as to obtain maximum signal amplitude from a given transducer, and also obtain a uniformly increasing particle velocity as the frequency is increased.

Figure 3:
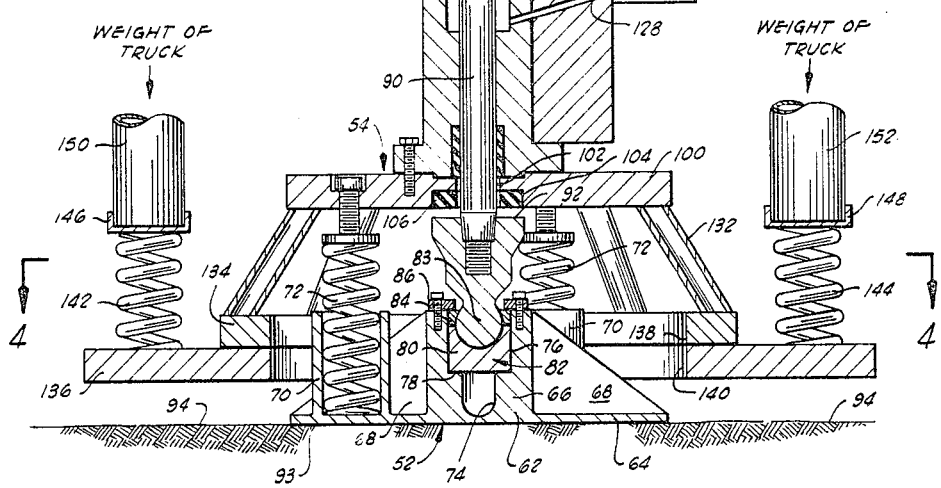
FIG. 3 is a vertical sectional view of a transducer for inducing seismic signals in the earth which is constructed in accordance with the present invention.

Referring now to FIG. 3, a novel transducer for imparting seismic signals to the earth is indicated generally by the reference numeral 50. The transducer 50 has a coupling mass member, indicated generally by the reference numeral 52, and a reaction mass system, indicated generally by the reference numeral 54, which are interconnected by a hydraulic linear actuator, indicated generally by the reference numeral 56, and having a cylinder 58 and piston member 60. It will be understood that the cylinder 58 forms a part of the reaction mass system 54, while the piston member 60 forms a portion of the coupling mass member 52. The coupling mass member 52 has a footplate 62 which may be cast from a single piece of aluminum to reduce the weight of the coupling mass member 52 as much as practicable. The footplate 62 has a base plate portion 64, a center shank portion 66, three equally spaced gusset plate portions 68 interconnecting the base plate portion 64 and the shank portion 66 for reinforcing purposes, and three tubular wells 70 for receiving three static loading springs 72, for purposes hereafter described in greater detail.

The shank portion 66 is hollow at 74 and is counterbored at 76 to provide an upwardly facing annular shoulder 78. The lower half 80 of a socket of a ball joint coupling, indicated generally by the reference numeral 82, is received in the counterbore 76 and rests on the annular shoulder 78. The ball 83 of the ball joint coupling 82 is received in the lower socket half 80 and is retained in place by the upper socket half 84 and by a circular retaining ring 86 which is bolted to the shank portion 66. The upper end of the ball joint coupling 82 is threaded onto the lower rod 90 of the piston member 60. The upper end of the ball joint coupling 82 forms an annular shoulder 92 for contacting a resilient bumper 106 hereafter described. The lower face 93 of the plate portion 64 is shown in contact with the surface 94 of the earth.

The reaction mass system 54 includes a base plate 100 having a central bore 102 which receives the lower rod 90. A counterbore 104 receives the annular resilient bumper 106 which may comprise a rubber washer having a total uncompressed volume less than the total volume of the counterbore 104. The cylinder 58 of the hydraulic linear actuator 56 is bolted to the base plate 100. The cylinder 58 may be any conventional motor cylinder suitable for receiving the double rod end piston member 60. The upper rod 108 of the piston member 60 extends through the upper end of the cylinder 58 and into the housing 110 which is bolted on top of the cylinder 58. The windings 114 and 116 of a pair of control transformers for governing the stroke of the piston member 60 are connected to the top plate 118 of the housing 110. The cores 120 and 122 of the control transformers are connected to the upper end of the upper rod 108. A hydraulic fluid manifold 124 is connected to the cylinder 58. Fluid flow through a pair of hydraulic fluid ports 126 and 128 is controlled by an electrically actuated four-way hydraulic valve 130. The valve 130, alternately, switches high pressure fluid to the port 126 while connecting the port 128 to exhaust, then connects the port 128 to high pressure fluid while connecting the port 126 to exhaust, such that the piston member 60 will be reciprocated within the cylinder 58 in synchronism with the alternating electric signal used to actuate the valve 130.

The plate 100 is connected by a plurality of downwardly and radially projecting tubular members 132 to a ring member 134, the tubular members 132 being welded to both the plate 100 and the ring member 134. The ring member 134 is connected to a lower base plate 136 by welding, bolts or any other suitable fastening means. Both the ring 134 and the lower base plate 136 have circular apertures 138 and 140, respectively, which are slightly larger than the base plate portion 64 of the footplate 62. The plate 136 has a configuration substantially as shown in FIG. 4. A pair of springs 142 are spaced apart and connected to one end of the plate 136, and a similar pair of springs 144 are spaced apart and connected to the other end of the plate 136. A horizontally disposed channel 146 interconnects the upper ends of the pair of springs 142, and a similar channel 148 interconnects the upper ends of the pair of springs 144. Suitable upright posts 150 and 152 then connect the channels 146 and 148 to a transporting truck (not shown). The upright posts 150 and 152 may conveniently form a part of a structure of the type disclosed in U.S. Patent No. 3,024,861, issued March 13, 1962, to F. Clynch, entitled "System for Anchoring and Transporting a Seismic Vibrator."

From the above description, it will be noted that the coupling mass member 52 includes the weight of the footplate 62, the ball and socket coupling 82, the piston member 60, and the cores 120 and 122 of the control transformers. As previously mentioned, the footplate 62 is preferably cast from aluminum. The ball and socket coupling 82 may be fabricated from plastic, aluminum or other suitable lightweight, durable material. The piston member 60 will, as a practical matter, be limited to steel, but the rods 90 and 108 may be constructed from tubular goods to reduce the total weight. Thus it will be appreciated that the coupling mass member 52 may weigh appreciably less than 175 lbs., and in one successful embodiment weighed a total of only approximately 120 lbs.

The reaction mass system 54, on the other hand, includes the base plate 100 and all structure connected thereto including the cylinder 58, the housings 110 and 112 and associated control transformer coils, the manifold 124 and valve 130, the tubular members 132, the ring 134 and the plate 136. This structure may of course easily be made as heavy as desired, but in a typical embodiment may be on the order of 1500 lbs. It will be noted that only the lower face of the footplate 62 contacts the surface 94 of the earth. However, the springs 72 permit a static load to be applied through the springs 142 and 144 for holding the footplate 62 pressed firmly against the surface of the earth. The springs 72 will not appreciably interfere with operation of the coupling mass member 52 so long as the spring constants of the springs are selected to have a resonant frequency as low as possible and thereby have, in combination with the coupling mass member 52, a resonant frequency below the lowest operating frequency of the transducer, which will usually be approximately 15 c.p.s.

It will be appreciated that the weight of the truck could also be made a part of the reaction mass system 54 by connecting it rigidly to the lower base plate 136. However, this would result in excessive vibration of the truck. Therefore the static hold-down springs 142 and 144 are provided to isolate the relatively slight motion of the reaction mass system from the upright posts 150 and 152 and therefore from the truck. Of course, the hold-down springs 142 and 144 should also be selected to have a low spring constant such that the springs will not resonate at normal operating frequency and interfere with the proper operation of the transducer 50 by varying the effective mass of the reaction mass system 54.

Referring now to FIG. 5, an electromagnetically driven transducer constructed in accordance with the present inaction mass by at least one resilient, compressible member; and, means connecting the reaction mass to the coupling member by at least one resilient, compressible member for transmitting a static hold-down load from the reaction mass to the coupling member.

6. A device for inducing seismic signals in the earth, comprising:

a coupling member for engaging a surface of the earth having a contact area sufficiently large as not to appreciably penetrate the surface of the earth and having a total weight less than 175 pounds;

a reaction mass system; and, motor means interconnecting the coupling member and the reaction mass system for reciprocating the coupling member relative to the reaction mass system.

7. A device as defined in claim 6 characterized further to include:

a hold down member; and a resilient, compressible member connecting the hold down member to the reaction mass system for applying the weight of the hold down member to the reaction mass system and maintaining the coupling member in engagement with the surface of the earth.

References Cited by the Examiner

UNITED STATES PATENTS

| | | | |
|---|---|---|---|
| 2,223,024 | 11/1940 | Beierlein | 94—48 |
| 3,024,861 | 3/1962 | Clynch | 181—.5 |
| 3,106,982 | 10/1963 | Wade | 181—.5 |
| 3,216,525 | 11/1965 | Fail et al. | 181—.5 |

BENJAMIN A. BORCHELT, *Primary Examiner.*

CHESTER L. JUSTUS, *Examiner.*

T. H. TUBBESING, G. H. GLANZMAN,
*Assistant Examiners.*